Nov. 26, 1968   C. F. SOUMAR   3,412,661

PHOTOGRAPHY APPARATUS

Filed Nov. 15, 1965   2 Sheets-Sheet 1

INVENTOR
CHARLES F. SOUMAR
BY
Schmieding & Sultz
ATTORNEYS

United States Patent Office 3,412,661
Patented Nov. 26, 1968

3,412,661
PHOTOGRAPHY APPARATUS
Charles F. Soumar, Marathon, Fla., assignor to Underwater Photographic Service, Inc., Marathon, Fla., a corporation of Florida
Filed Nov. 15, 1965, Ser. No. 507,889
4 Claims. (Cl. 95—11)

The present invention relates generally to photography apparatus and particularly to a novel apparatus for adapting a conventional camera to take underwater photographs.

In general, the present invention comprises a water-tight housing provided with a removably attached wall to permit a conventional camera to be removably mounted in the housing. A pair of novel actuating means are mounted on the housing for actuating the camera shutter and film advance mechanisms.

In accordance with the present invention, the novel housing and associated actuating means permit low cost conventional cameras to be used for taking photographs while being submerged in water.

As another aspect of the present invention, the actuating means are manufactured as a standard element and include an arm portion which is easily deformable so as to engage the shutter and film advance mechanism of most of the conventional cameras presently in use.

As another aspect of the present invention, the novel housing includes a simple efficiently constructed wall which is removably attached in sealed relationship with the remainder of the housing to enable the camera to be placed in the housing or removed therefrom with a minimum of effort.

As still another aspect of the present invention, the walls of the housing are formed of sheets of an inexpensive synthetic resinous material which are cemented together at confronting edge portions and therefore may be manufactured and fabricated at very low cost as compared to the cost of relatively complex and expensive cast metal housings heretofore used.

It is therefore an object of the present invention to provide an apparatus of the type described which permits conventional relatively low cost cameras to be used for underwater photography.

It is another object of the present invention to provide an apparatus of the type described which is not limited to a certain style or design of any one particular camera. The size of the housing and the deformable arm portions of the actuating means may be easily adapted for use with a variety of cameras presently offered to the public by different manufacturers.

It is another object of the present invention to provide an apparatus of the type described which is extremely simple to operate.

It is still another object of the present invention to provide an apparatus of the type described which is constructed of a durable inexpensive transparent material which lends itself to large volume inexpensive manufacture and fabrication.

Further objects and advantages of the present invention will be apparent from the following description, reference being had to the accompanying drawings wherein a preferred form of embodiment of the invention is clearly shown.

Figure 1:
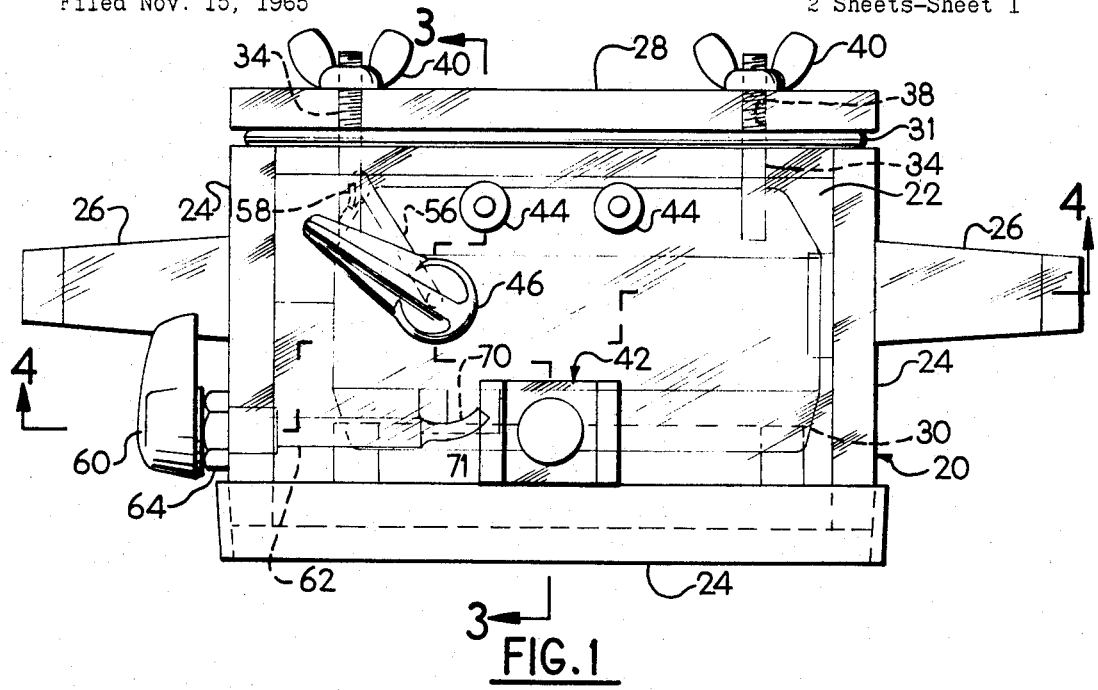
FIG. 1 is a top plan view of a camera housing for underwater photography constructed in accordance with the present invention and is illustrated with a conventional camera mounted in the housing.

Referring in detail to the drawings, an apparatus for taking underwater photographs is illustrated in FIGS. 1–4 and includes an outer protective housing indicated generally at 20.

Housing 20 is made of an inexpensive synthetic resinous material, preferably transparent, such as, for example, plexiglass sheet material, and includes top and bottom walls 22 and three side walls 24 which are bonded to walls 22 in water-tight relationship. Any suitable water resistant plastic adhesive may be used to bond the walls together. On a pair of opposing side walls 24 are provided handles 26 for convenient gripping of housing 20 by the user.

A removably attached side wall 28 permits access to the inside of housing 20 wherein a conventional camera 30 may be removably mounted.

Figure 3:
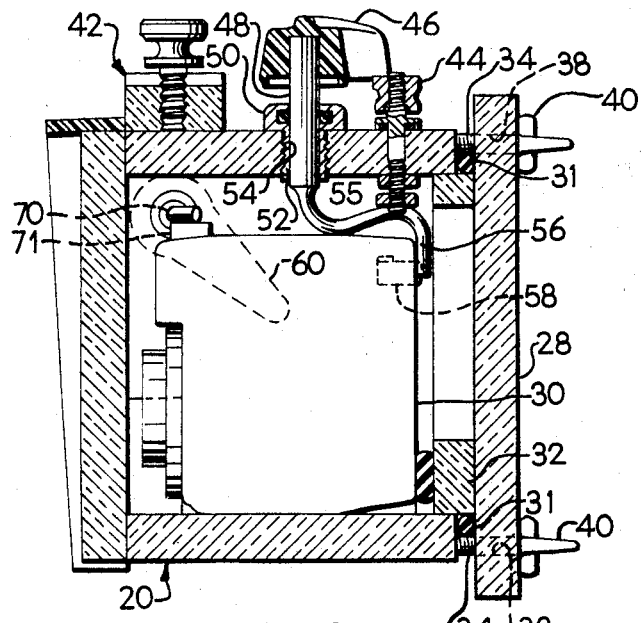
FIG. 3 is a side sectional view of the camera apparatus shown in FIG. 1, the section being taken along line 3—3 in FIG. 1.
Figure 4:
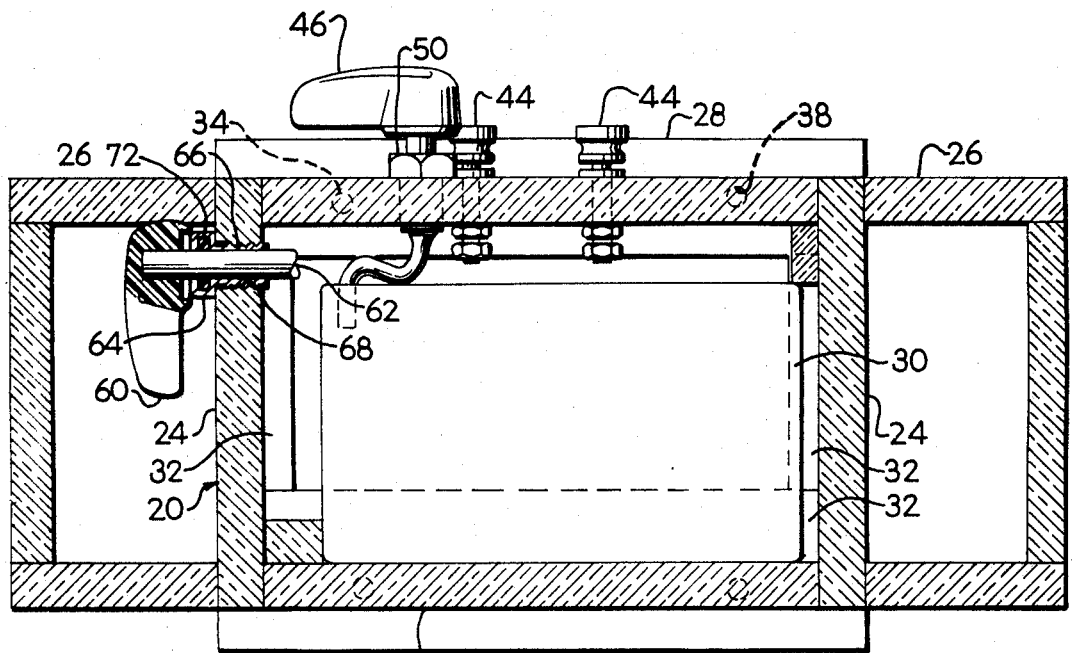
FIG. 4 is a front sectional view of the apparatus shown in FIG. 1, the section being taken along the line 4—4 in FIG. 1.

Referring now to FIGS. 3 and 4, side wall 28 includes an outwardly extending lip portion 32 which partially extends into the interior of housing 20. A resilient seal 31 is retained in surrounding relationship to lip portion 32.

A plurality of threaded bolts 34 have their inner ends rigidly fastened to walls 22 and outer ends are removably extended through bores 38 provided in side wall 28.

Preferably, top and bottom walls 22 are of increased thickness to provide added strength and durability to the junction between bolts 34 and housing 20.

To fasten side wall 28 to bolts 34 and to seal wall 28 into water-tight engagement with housing 20, a plurality of wing nuts 40 are provided. It is understood that now upon tightening wing nuts 40, wall 28 is urged inwardly which forces resilient seal 31 into sealed engagement with edge portions of walls 22, 24, and 28.

A flash gun mounting means 42 and electrical wiring contacts 44 are illustrated in the drawing and are accessory items which in no way limit the scope of the present invention.

A first actuating means include a manually actuated knob 46 fastened to a rod 48. Rod 48 is rotatably mounted in housing 20 through a bore in a bearing member which includes a cap portion 50 and a threaded stem portion 52. Stem portion 52 is disposed in a threaded bore 54 provided in top wall 22 so that the periphery of cap 50 is in sealed relationship with top wall 22.

The lower or inner end of rod 48 includes a deformable arm portion 56 which is of smaller diameter than the upper end of rod 48.

An annular resilient seal 55 is disposed in cap portion 50 in surrounding relationship with rod 48 to seal the bore through which rod 48 is extended.

Arm portion 56 is bent or deformed to engage the film advance lever 58 which actuates the film advance mechanism of camera 30.

Film advance lever 58 is pivotally mounted within camera 30 and is biased to return to the original position illustrated by the dotted lines in FIG. 1 after being forced toward the front of camera 30 upon rotation of knob 46.

A second actuating means also includes a manually actuated knob 60 fastened to a rod 62 and is rotatably mounted in an identical manner as the previously described first actuating means.

Rod 62 is disposed through a bore in a bearing member which includes a cap portion 64 and a threaded stem portion 66. Stem portion 66 is threaded into a threaded bore 68 in side wall 24.

The inner end of rod 62 includes a deformable arm portion 70 which is bent to engage button 71 of the shutter mechanism of camera 30.

A resilient seal 72 is disposed in cap portion 64 in surrounding relationship with rod 62 to seal the bore through which rod 62 is mounted from the surrounding environment.

Figure 2:
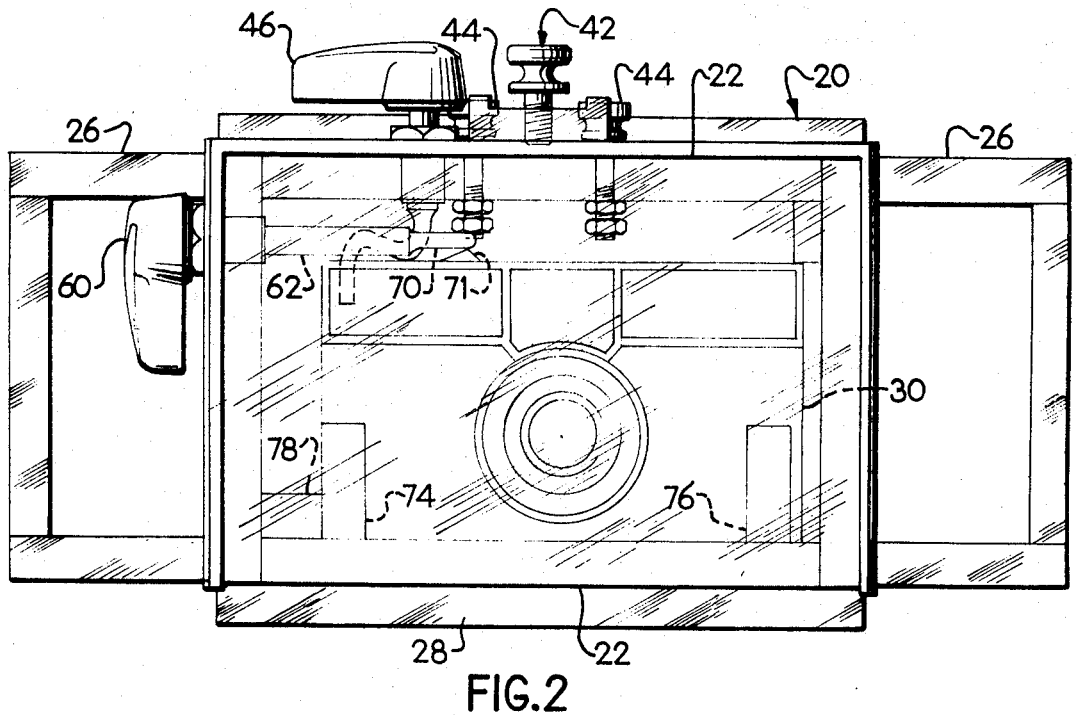
FIG. 2 is a front elevational view of the camera apparatus shown in FIG. 1.

Now referring specifically to FIGS. 2 and 3, camera 30 is held firmly in place by means of shoulders 74, 76, and 78 provided inside housing 20 and a resilient pad 80 which is fastened to portion 32 of removable wall 28.

In operation, the user removes wall 28 by manually unscrewing wing nuts 40 from bolts 34.

A conventional camera 30, such as the Kodak Instamatic 300 for example, which has been loaded with film is placed inside housing 20. The front of the camera 30 engages shoulders 74 and 76, and one side engages shoulder 78.

Removable wall 28 is replaced by sliding said wall onto bolts 34 through bores 38 and then wing nuts 40 are firmly screwed onto the bolts 34.

Resilient seal 31 then provides a water-tight seal with housing 20 as previously described.

Assuming that the film has already been positioned to take the first photograph before placing camera 30 in housing 20, the user may then take a photograph by simply rotating knob 60 which of course rotates rod 62 and bent arm portion 70 which in turn presses button 71 downwardly to actuate the camera shutter mechanism in the same manner as if the camera were operated outside of housing 20.

The camera is aimed in the conventional manner as the user may hold onto the handles 26 and look through back wall 28 through the camera sight as the walls 28 and 24 are transparent.

Knob 62 may be conveniently rotated forwardly with the thumb of the right hand while holding handles 26 in the fingers.

After a photograph has been taken, the user rotates knob 46 which rotates arm portion 56 into force transmitting engagement with film advance lever 58 to advance the film in the camera into position to take another photograph.

It is important to point out that rods 48 and 62 may be made according to a single standard dimension with the deformable arm portions 56 and 70 being selectively bent later in assembly to fit various actuating locations for the specific camera which is to be placed in housing 20. This permits a saving to be realized in manufacturing costs which in addition to the inexpensive cost of housing 20 makes the apparatus of the present invention extremely economical.

While the form of embodiment of the present invention as herein disclosed constitutes a preferred form, it is to be understood that other forms might be adopted, all coming within the scope of the claims which follow.

I claim:
1. A camera housing for underwater photography comprising, in combination, a water-tight housing including top, bottom, and side walls, a rear opening surrounded by a sealing surface, a removable rear wall including a second sealing surface, and a transparent front wall; camera actuating means including mounting means extending in sealed relationship through one of said walls and provided with a bore, an actuating rod movably disposed in sealed relationship in said bore and including an outer portion provided with a handle and an inner deformable portion whereby said inner deformable portion can be positioned to various actuating locations by selective bending of said inner portion; a resilient seal between said sealing surfaces; and means for compressing said seal between said sealing surfaces.

2. The camera housing defined in claim 1 wherein each of said walls are formed of sheets of a synthetic resinous material and each of said walls except said removably mounted wall is bonded to adjacent walls at confronting edge portions.

3. An apparatus for taking photographs underwater comprising, in combination, a water-tight housing including at least one removably attached wall means for providing access to the inside of said housing, said housing and removably attached wall means including confronting sealing surfaces; a resilient seal between said sealing surfaces; a camera removably mounted in said housing and including a shutter mechanism and a film advance mechanism; first actuating means rotatably mounted on said housing and including a deformable arm portion for engagement with said shutter mechanism; and second actuating means rotatably mounted on said housing and including a deformable arm portion for engagement with said film advance mechanism, said deformable arm portion being selectively bent to various actuating locations according to the position of the shutter and film advance mechanisms of the camera disposed within the housing.

4. The camera housing defined in claim 3 wherein each of said walls are formed of sheets of a synthetic resinous material and each of said walls except said removably mounted wall is bonded to adjacent walls at confronting edge portions.

References Cited

UNITED STATES PATENTS

| 2,487,868 | 11/1949 | Grigsby | 95—11 |
| 2,901,143 | 8/1959 | Pope | 95—11 |
| 2,944,474 | 7/1960 | Dennis | 95—11 |
| 3,019,715 | 2/1962 | Arnold et al. | 95—11 |

NORTON ANSHER, *Primary Examiner.*

C. E. SMITH, *Assistant Examiner.*